Nov. 13, 1962  R. E. McCARTNEY  3,063,353
MEANS FOR COUPLING LIGHT METERS TO CAMERAS
Filed April 22, 1960  3 Sheets-Sheet 1

INVENTOR.
ROBERT E. McCARTNEY
BY
ATTORNEY

INVENTOR.
ROBERT E. McCARTNEY
BY
ATTORNEY

United States Patent Office 3,063,353
Patented Nov. 13, 1962

3,063,353
MEANS FOR COUPLING LIGHT METERS TO CAMERAS
Robert E. McCartney, Fort Worth, Tex., assignor to Arel, Inc., St. Louis, Mo., a corporation of Missouri
Filed Apr. 22, 1960, Ser. No. 24,017
14 Claims. (Cl. 95—10)

This invention relates in general to certain new and useful improvements in photographic devices and, more particularly, to means and methods for coupling light meters to the exposure system of a camera.

Professional photographers, or camera-enthusiasts ordinarily employ cameras having a wide range of different shutter speeds and a corresponding range of aperture-settings, or so-called "openings" through which more or less light may pass. The combination of shutter speed and opening will vary for different film-speeds, that is to say the degree of light sensitivity of the photographic emulsion on the film being used in the camera. The handling of these variables, in the taking of pictures, is, of course, the essence of photographic skill. Any camera user, even with limited experience, is familiar with the differences in film-speeds and this becomes a matter of choice and selection. Similarly, the average camera user quickly becomes familiar with the considerations which dictate a selection of shutter speed. Finally, the aperture-setting or opening will depend upon the amount of light which illuminates the subject and this variable is usually resolved by the use of a light meter.

Accordingly, most of the modern light meters are equipped with scales which serve to convert the reading which can be derived from the light meter needle into related combinations of aperture-settings and shutter speeds, for a particular or selected film-speed. In using a light meter as a camera accessory, therefore, it is necessary to take a light reading and then by use of the conversion scales, arrive at some desired combination of aperture-setting and shutter speed which then must be manually transferred to the camera preparatory to taking the picture. As every camera user knows, this sequence of operations and manipulations introduces a great deal of room for error. Moreover, these operations are somewhat time-consuming even for the most skillful photographer and very often the subject will move or the quality of light will change during the interval in which the camera settings are being made, no matter how short that interval may appear to be.

Recently, a number of camera manufacturers have endeavored to overcome these problems and simply photographic techniques for the casual camera user by manufacturing cameras with so-called "built-in" light meters and, even more recently, some cameras have been introduced in which light sensitive cells are either electrically or mechanically coupled within the camera to the aperture-setting mechanism so that the camera becomes "automatic," so to speak. Such cameras, however, are relatively expensive as compared with the combined price of a conventional camera and accessory light meter. Moreover, even the most expensive and most carefully constructed light meters are delicate instruments and can very easily be broken or thrown out of adjustment. A separate light meter used as an accessory to the camera can, of course, be repaired or replaced without affecting the operation of the camera. On the other hand, cameras with built-in light-sensitive devices become wholly and entirely inoperative if the light-sensitive device is broken or thrown out of adjustment, and, thus, the camera user s deprived completely of the use of the camera whenever it becomes necessary to repair or adjust the light-sensitive device. Obviously, the cost and frequency of repairs on cameras with such built-in light-sensitive devices has been found to be very great. Consequently, cameras with built-in and coupled light-sensitive devices have not proven, as yet, to be a wholly satisfactory solution to the above-mentioned problem and, of course, this approach to the problem does not offer any solution for the owners of conventional cameras who now use accessory-type light meters.

It is, therefore, the primary object of the present invention to provide an accessory-type light-sensitive device which is coupled to the aperture-setting mechanism of a camera in a manner external to the existing mechanism of a camera so as to be readily and conveniently mounted on the existing types of cameras without requiring extensive or permanent internal modification and adaptation of the camera mechanism itself.

It is another object of the present invention to provide an accessory light-sensitive device of the type stated which can be mounted externally upon an existing camera and will eliminate the need for interpreting a light meter and transferring information to the various camera settings.

It is a further object of the present invention to provide an accessory light-sensitive device of the type stated which is relatively simple in operation and economical in cost.

With the above and other objects in view, my invention resides in the novel features of form, construction, arrangement, and combination of parts presently described and pointed out in the claims.

In the accompanying drawings (three sheets).

Figures 1, 2, 3, 4, 5, 6:
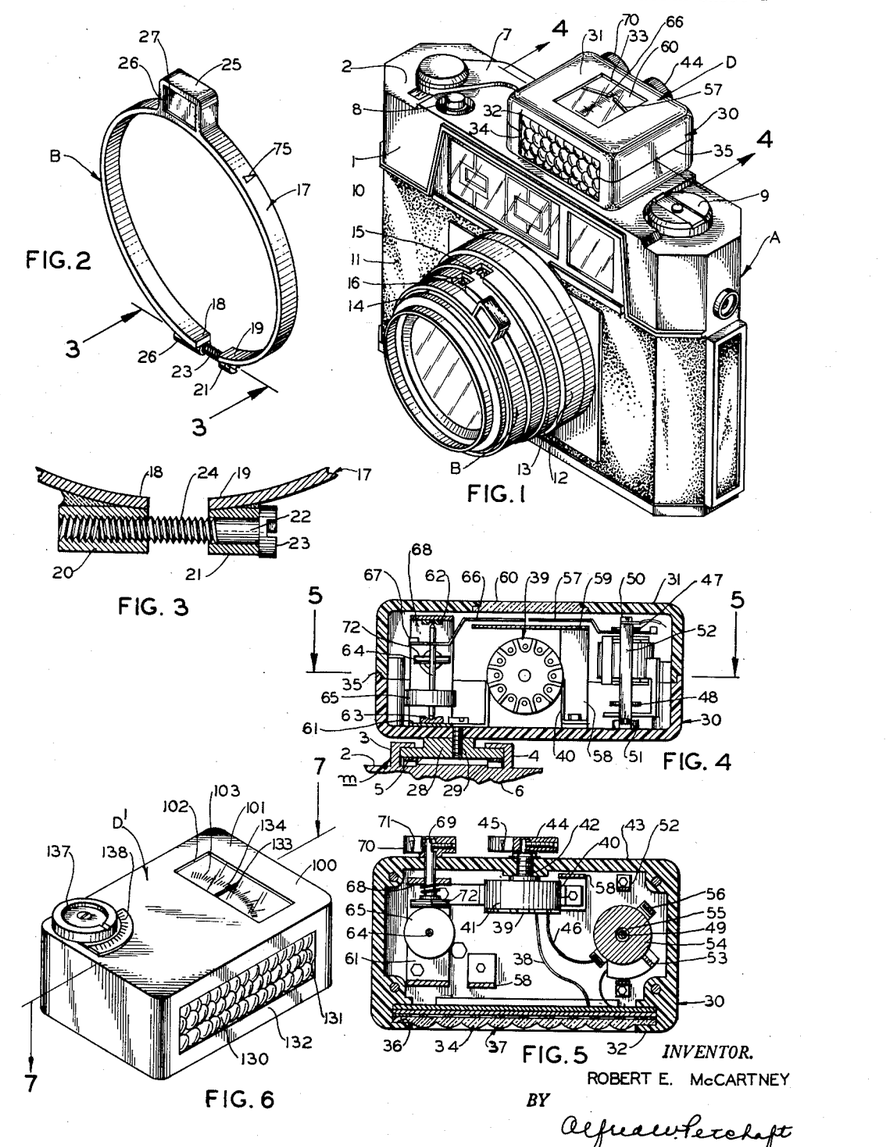
FIG. 1 is a perspective view of camera equipped with a light-sensitive device constructed in accordance with and embodying the present invention.
FIG. 2 is a perspective view of the magnet-mounting or adapter ring forming a part of the present invention.
FIG. 3 is a fragmentary sectional view taken along line 3—3 of FIG. 2.
FIG. 4 is a fragmentary sectional view taken along line 4—4 of FIG. 1.
FIG. 5 is a horizontal sectional view taken along line 5—5 of FIG. 4.
FIG. 6 is a perspective view of a modified form of light-sensitive device constructed in accordance with and embodying the present invention.

Referring now in more detail and by reference characters to the drawings which illustrate practical embodiments of the present invention, A designates a camera which, for purposes of the present description, is a 35 millimeter camera including an outer shell or housing 1 having a top wall 2 conventionally provided with spaced slide flanges 3, 4, and flat elongated leaf-springs 5, 6, forming the usual type of accessory-mount *m*. The camera A also includes a film-advance lever 7, a shutter-releasing button 8, a film-rewind handle 9, and a split-image range finder 10, all of which are conventional components and are, therefore, not shown or described in detail herein. Operatively mounted on the front wall 11 of the camera A is a lens system which may be of any conventional or standard design and includes a focusing ring 12, a shutter-speed setting ring 13 and an aperture-setting ring 14. As is usual practice in the construction of lens systems of this type, the shutter-speed setting ring 13 is associated with an indexing window or opening 15 through which the reading of the particular shutter-speed will be visibly displayed. Similarly, the aperture-setting ring 14 is provided with a window or opening 16 through which a number conforming to the iris-opening or aperture can be read.

Provided for cooperation with the aperture-setting ring 14 of the camera A is a magnet-mounting ring or adapter B which integrally includes a relatively narrow circular band 17 formed preferably of spring steel and provided with split ends 18, 19, provided externally with welded or soldered tubular sleeves 20, 21, respectively. The sleeve 20 is internally threaded and the sleeve 21 is internally provided with a smooth surface bore for receiving the smooth surface shank 22 of a clamping screw 23. The distal end 24 of the clamping screw 23 is threadedly inserted in the sleeve 20 so that the clamping ring 17 can be fitted peripherally around the aperture-setting ring 14 and tightened securely and permanently thereto. Formed integrally with and extending radially outwardly is a somewhat rectilinear protuberance 25 which is formed with a transversely extending rectangular socket 26. Tightly press-fitted, or otherwise permanently secured within the socket 26 is a relatively strong permanent magnet 27. It will, of course, be obvious that the length of the clamping screw 23, the normal gap between the split ends 18, 19, and the amount of inherent flexibility in the steel used for fabricating the ring 17 will make it possible to clamp the ring B securely upon various different styles and types of cameras within a reasonably wide range of sizes. Of course, the diametral sizes of different lens mounts and different aperture-setting rings will vary over an extremely broad range. Consequently, it may be necessary, in commercializing the present invention, to make the ring B in a number of different sizes so that practically any existing type of camera can be fitted.

Provided for removable disposition in the accessory-mount *m* on the top wall 2 of the camera A by means of a T-shaped foot plate 28 and mounting screw 29 is a light-sensitive device D comprising a hollow rectilinear housing 30 having a horizontal top wall 31 and a front wall 32 respectively provided with rectangular openings or windows 33, 34. The housing 30 is preferably made of two matching molded plastic halves which are marginally flanged and adhesively secured together around a joint-line 35, as best seen in FIG. 4. Molded directly into the margins of the window 34 is a peripheral slot or groove 36 which securely engages the marginal portions of a rectangular photocell 37 which is preferably of the conventional selenium type and will generate a direct current voltage which is directly proportional to incident light. One terminal of the photocell 37 is connected by a lead-wire or conductor 38 which is connected to one terminal of a small rheostat 39 mounted within the housing 30 by means of a bracket 40 having a rheostat encircling bight 41. The rheostat 39 is provided with a shaft 42 which extends rotatably through the back wall 43 of the housing 30, being externally provided with an operating knob or handle 44 having an index mark 45 which is juxtaposed to a suitable scale imprinted upon the outer face of the back wall 43. The other terminal of the rheostat 39 is electrically connected by a lead-wire or conductor 46 to a spiral spring 47 and, similarly, the other terminal of the photocell 37 is electrically connected to a spiral spring 48, the springs 47, 48, being operatively mounted adjacent the upper and lower ends of a vertical spindle or shaft 49 which is, in turn, journaled at its upper and lower extremities between suitable jeweled bearings 50, 51. The jeweled bearing 50 is structurally supported by a U-shaped framework 52 and the jeweled bearing 51 is mounted rigidly upon the interior face of the shell or housing 30 in coaxial alignment with the jeweled bearing 50. Rigidly supported from the housing 30 by means of a bracket arm 53 and located approximately midway between the bearings 50, 51, is a stationary cylindrical permanent magnet 54, which is axially provided with a vertical bore 55 of considerably larger diametral size than the diametral size of the shaft 49 so that the shaft 49 will pass axially through and rotate freely within the magnet 54. Rigidly mounted upon and carried by the shaft 49 is a somewhat rectangular galvanometer coil 56 which loosely surrounds the stationary permanent magnet 54 and is freely rotatable in relation thereto with the shaft 49. The ends of the galvanometer coil 56 are electrically connected to the springs 47, 48, so that the current generated by the photocell 37 will pass through the turns of the coil and, by interaction with the lines of force from the permanent magnet 54 will cause the galvanometer coil 56 to rotate in the usual manner. Also rigidly mounted upon and carried by the shaft 49 is a radially projecting indicator needle 57 which extends beneath the top wall 31 of the housing 30 and is visible through the window 33 thereof. Rigidly supported within the housing 30 by means of a bracket 58 is a flat scale-plate 59 which is held in downwardly spaced parallel relation to a transparent glass closure 60 which is adhesively or otherwise suitably secured within the window 33. As will be seen by reference to FIG. 4 the needle 57 swings freely in the space between the scale-plate 59 and the window 60.

It should be noted in this connection that by suitable manipulation of the rheostat knob 44, it is possible to vary the amount of current transmitted to the galvanometer coil 56 and the needle 57 to correspond to a different ASA film speed rating. Consequently, by rotating the rheostat knob 44 to a suitable numerical indication on the scale associated with the index scale, the light-sensitive device D will be adjusted to the speed of any selected type of film which may be placed in the camera A. Since the scale of ASA film speed ratings is logarithmic, the increments of resistance in the rheostat 39 will be correspondingly so arranged.

Also rigidly mounted within the interior of the housing 30 and on the opposite side thereof with respect to the bracket 52 is a bracket or frame 61 having vertically aligned upper and lower jeweled bearings 62, 63, rotatably supporting a shaft 64 which is rigidly provided with a cylindrical permanent magnet 65. Also rigidly secured to the shaft 64 for rotation therewith is a radially projecting needle or indicating arm 66 which extends into the space between the scale-plate 59 and the window 60 in operatively juxtaposed relation to the needle 57. Preferably, though not necessarily, the needle 66 is provided on its remote end with a small counter-balancing weight 67.

Journaled in and extending horizontally through one vertical leg 68 of the bracket 61 and also extending rotatably through the back wall 43 of the housing 30 is a shaft 69 externally provided with a manually operable knob or handle 70 having an index arm 71 which is juxtaposed to a suitable numerical scale printed on the outwardly presented face of the back wall 43, and calibrated in correspondence with the various available shutter speeds built into the camera A. Rigidly mounted upon the interior end of the shaft 69 for rotation therewith is a small rod-shaped permanent magnet 72 which lies more or less directly above the periphery of the magnet 65 and, by interaction of magnetic lines of force, biases the magnet 65 and its associated needle 66. Thus, by rotating the knob 70 it is possible to magnetically bias the permanent magnet 65 to a predetermined initial position over the scale-plate 59 which position corresponds to a selected shutter speed.

The permanent magnet 65 is also magnetically interlocked with the permanent magnet 27 carried by the ring A. Thus, when the aperture-setting ring 14 is rotated and with it the magnet 27 is shifted either closer to, or farther away, from the magnet 65, the lines of magnetic force interlocking the magnets 65 and 27 will either increase or decrease depending upon physical position. This change in magnetic relationship will cause the magnet 65 to "follow" the magnet 27 and will produce a rotation of the shaft 64, thereby swinging the needle 66 in direct relationship to the position to which the aperture-setting ring 14 is being rotated. Consequently, if it be assumed that the rheostat 39 is adjusted to some elected film speed corresponding to the film in the camera A, and that the incident light on the photocell 37, by generating a certain amount of electrical current, has rotated the galvanometer coil 56 accordingly, then the needle 57 will move to the position shown in FIG. 1. Although, for convenience, a light-reading scale is shown and described on the visible face of the scale-plate 59, it is not necessary to take a numerical reading, or in any way become concerned with this light-reading scale. It is merely necessary to select some desired shutter speed which can be set up by suitable rotation of the ring 13. The light-sensitive device D is then correspondingly set by suitable rotation of the biasing magnet 65. The needle 66 will not, at this point in the manipulation procedure, ordinarily be aligned with the needle 57. Of course, if the needles 57, 66, happen to be in alignment, this merely means that the particular aperture-setting to which the camera A happens to be set is the correct aperture-setting for the light conditions on the subject being photographed at the selected shutter speed and film-speed rating, in which case it will not be necessary to move the aperture-setting ring 14. Most likely, however, the needles 57 and 66 will be out of alignment and it will be necessary to rotate the aperture-setting ring 14 bringing the magnet 27 either toward or away from the light-sensitive device D until the needle 66 swings into alignment with the needle 57, and when this is achieved the aperture will be set at the precise opening needed for the particular light condition to which the photographic subject is being exposed.

It will, of course, be evident that the camera user will find the operation of the camera very much simplified by use of the light-sensitive device D. In the first place, it is only necessary to set the rheostat 39 at the time the camera is being loaded with film. Indeed, most camera users employ the same type of film time after time and, therefore, the setting of the rheostat 39 will only be changed occasionally if a different type of film is used. After the camera is loaded the camera user ordinarily sets up some shutter speed which is most frequently employed and leaves the shutter set at this speed until some special circumstances require selection of a different shutter speed. The experienced photographer and the average camera user will usually employ a shutter speed of either $1/100$ sec. or $1/50$ sec., since these shutter speeds are most often used for the ordinary run of pictures. Therefore, with the light-sensitive device D it will be convenient to set the knob 79 at some standard shutter speed which is most frequently employed. Then it merely becomes necessary to rotate the aperture-setting ring 14 and its associated magnet 27 to line up the two needles 57 and 66 at the time a picture is being taken, and the proper corresponding aperture setting can thus be achieved in a very precise and convenient manner. It should be noted that the mounting ring B should be fastened upon the aperture-setting ring 14 in such initial position that this result is achieved. The initial position, of course, must be carefully computed or empirically determined for each brand or make of camera and can be designated by instructions accompanying the device as it is sold. This determination can be made in several ways, but one effective method is to set the camera at a shutter speed of $1/50$, for instance, and at an aperture of $f8$. An arbitrarily chosen subject can then be artificially illuminated with the exact amount of light required for optimum photographic results. The camera, with the light sensitive-device D mounted thereon, can be pointed to the subject so that the light will enter the photocell 37 in exactly the manner which it would if a picture were being taken. Obviously, the needle 57 will swing to some corresponding position. Then while holding the camera settings constant, the mounting ring B, which is left somewhat loose, can be rotated until the needle 66 lines up with the needle 57. Finally, the mounting ring B can be clamped in this position. The aperture-setting rings of most cameras will have scale markings of some sort to which an index mark 75 on the mounting ring B can be related and, consequently, this index mark 75 can be suitably scribed on the mounting ring B so that the purchaser merely need to line up these markings and tighten the clamping screw 23.

It is also possible to provide a modified form of light-sensitive device $D^1$ shown in FIGS. 6 to 9, inclusive, and comprising a hollow rectilinear housing or shell 100 having a top wall 101 provided with a viewing aperture or window opening 102 which is closed by a transparent window 103 adhesively or otherwise suitably secured in place. Rigidly mounted within the interior of the housing 100 is a rectangular frame member 104 including spaced parallel legs 105, 106, and a horizontal bight member 107. The legs 105, 106, are flanged outwardly and secured in place by means of bolts 108, 109, which extend through the bottom wall 110 of the housing 100 and also secure an external T-shaped foot-plate 111 adapted for removable disposition in a standard accessory mount of a camera substantially in the same manner as previously described plate. Welded or otherwise rigidly secured to the inner face of the leg 106 and extending inwardly in spaced parallel relation to the bight 107 is a supporting arm 112 which terminates a short distance beyond the vertical center line of the frame 104 and is provided on its opposite faces with coaxial jeweled bearings 113, 114, which lie along the center line of the frame 104. Similarly, the bight 107 is provided on its opposite faces with coaxial jeweled bearings 115, 116, also lying along the vertical center line of the frame 104. Pivoted at its opposite ends in and extending vertically between the bearings 113, 115, is a short shaft or pintle 117 which is provided, midway of its length, with a rotating permanent magnet 118. As will be seen by reference to FIGS. 7 and 8, the rotating magnet 118 is substantially smaller in diametral size than the horizontal distance between the legs 105, 106, of the frame 104, so that the magnet 118 will rotate freely within the frame 104.

Figures 7, 8, 9, 10, 11, 12:
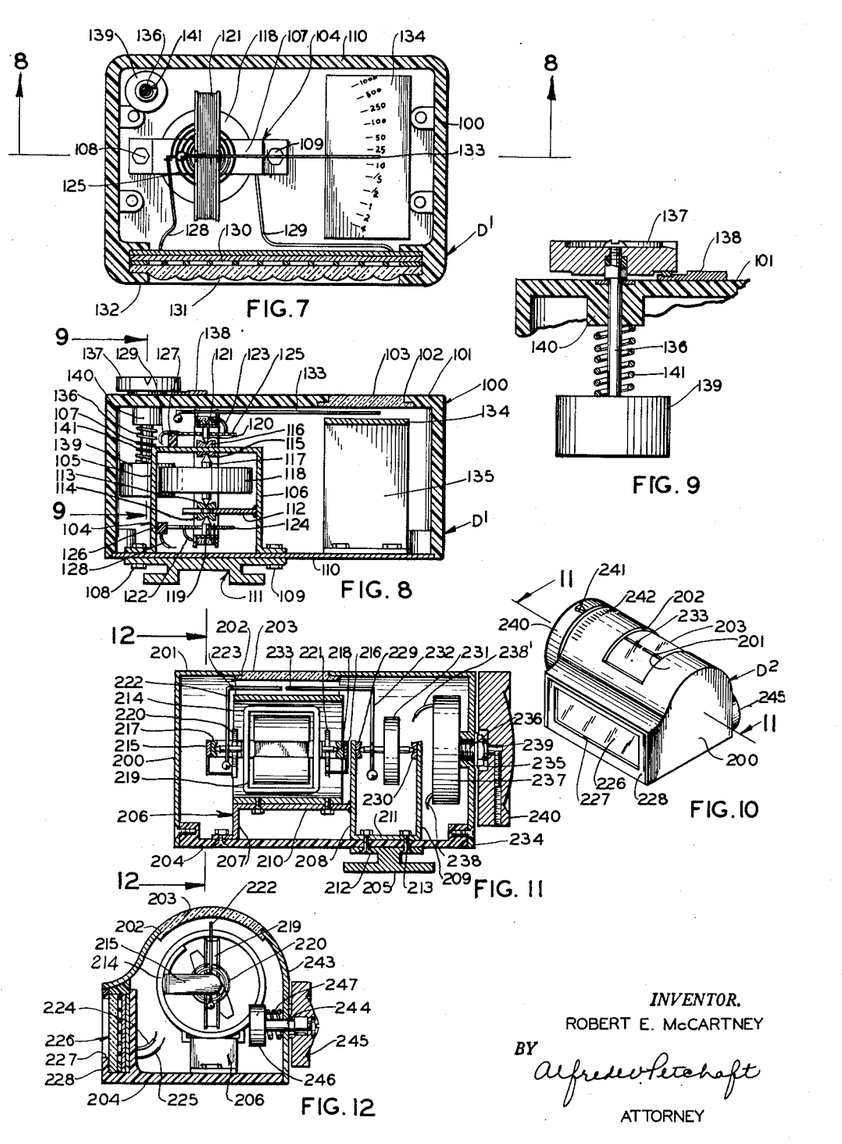
FIG. 7 is a vertical sectional view taken along line 7—7 of FIG. 6.
FIG. 8 is a horizontal sectional view taken along 8—8 of FIG. 7.
FIG. 9 is a fragmentary sectional view taken along line 9—9 of FIG. 8.
FIG. 10 is a perspective view of a further modified form of light-sensitive device constructed in accordance with and embodying the present invention.
FIG. 11 is a vertical sectional view taken along line 11—11 of FIG. 10.
FIG. 12 is a transverse sectional view taken along line 12—12 of FIG. 11.

Similarly pivoted by means of axially aligned pivot pins 119, 120, upon the bearings 114, 116, is a rectangular galvanometer coil 121, which is electrically connected at its opposite end by leads 122, 123, to spiral-spring conductors 124, 125, which are rigidly mounted at their inner ends upon the pivot pins 119, 120. At their outer ends the spiral-spring conductors 124, 125, are stationarily mounted to the frame 104 by insulated fasteners 126, 127, respectively, and are electrically connected by conductors 128, 129, to a photocell 130, which is substantially similar to the previously described photocell 37 and is marginally mounted in a window 131 formed in a side wall 132 of the housing 100.

Rigidly mounted upon the upper end of the galvanometer coil 121 and extending radially outwardly therefrom is an indicator arm or needle 133 which terminates at its outer end directly beneath the window 103 and above a scale-plate 134 which is suitably supported in downwardly spaced parallel relation to the window 103 by means of a bracket 135. Imprinted upon the upper face of the scale-plate 134 so as to be visible beneath the needle 133 through the window 103 are numbers corresponding to shutter speeds, all as best seen in FIG. 7 and for purposes presently more fully appearing.

Rotatably mounted in and extending through the top wall 101 of the housing 100 adjacent one corner thereof is a shaft 136 rigidly provided on its outer end with a manually operable knob 137 having an index mark on its periphery for visual cooperation with an arcuate scale 138 which is graduated in ASA film-speed ratings. Rigidly mounted on the inner end of the shaft 136 for rotation therewith is a cylindrical permanent magnet 139 which is magnetically interlocked by magnet lines of force with the magnet 118. Disposed encirclingly around the shaft 136 in endwise abutment at its opposite ends between the upper face of the magnet 139 and the under face of a boss 140 pivotally formed with the top wall 101 is a compression spring 141 which serves to hold the magnet 139 and the shaft 136 against unauthorized or free rotation. In other words, the spring 141 will hold the magnet 139 in any relatively rotated position to which it is set by manual rotation of the knob 137. Since the magnets 139 and 118 are magnetically interlocked, it is possible to rotate the magnet 139 to some selected position corresponding to a particular ASA film-speed rating and thereby cause the magnet 118 to rotate to a corresponding relative position within the frame 104. Assuming, for purposes of explanation, that no light is impinging upon the photocell 130, the galvanometer coil 121 will not be energized and the needle 133 will assume a completely meaningless central position between two of the graduations on the scale-plate 134. If desired, this condition can actually be achieved in practice by covering the window 131 in any suitable or conventional manner. However, as a matter of actual practice, some light may impinge upon the photocell 130 if it is uncovered, as shown in FIG. 6 and, in such case, the needle 133 may swing to some position other than the central position shown in FIG. 7.

Meanwhile, the camera is provided with a magnet-mounting ring or adapter B in the manner previously described. Rotation of the aperture-setting ring of the camera and the magnet-carrying mounting ring B associated therewith, will also operate upon the magnet 118 substantially in the manner previously described in connection with the magnet 65 of the light-sensitive device D and this will swing the galvanometer coil 121 and its associated needle 133 over the scale-plate 134. Assuming that the camera user has decided to use a shutter-speed of 1/100 and has, accordingly, set the shutter-speed ring of his camera to this particular setting, the mounting ring B is rotated until the needle 133 comes into alignment with the number one-hundred on the scale of the scale-plate 134. At this point, the aperture-setting will precisely correspond to the required opening necessary for a shutter-speed of 1/100 under the particular light conditions impinging on the subject which is being photographed.

The magnet 118 functions as a "follower" in relation to the magnet on the mounting ring B and the galvanometer coil 121, being shifted to some angular relationship with respect to the magnet 118 by reason of the current flowing therethrough due to the excitation of the photocell 130, will in turn, rotate in a "following" relationship to the same extent that the magnet 118 is rotated. Thus, the magnet 139 functions as a biasing magnet, the magnet 118 functions as a "follower" magnet, and the galvanometer coil 121 acts in response to the intensity of the light sensed by the photocell 130. The light-sensitive device D¹, in some respects, is simpler and less expensive than the previously described light-sensitive device D and may be considered simpler in operation by some camera users since the needle will actually point to a number or graduation on the scale plate 134 which corresponds to the numerical value of the selected shutter speed when the camera is ready for taking a particular picture. Moreover, the light-sensitive device may also be operated, if the camera user so desires, to indicate the correct shutter-speed for a selected aperture under particular light conditions. In other words, the camera user may direct the camera at the subject and shift the aperture-setting ring to some desired aperture-setting which he believes will give him a correct depth of focus. The needle 133 will then give him a direct reading of the shutter-speed which he must set into his camera under the light conditions then impinging upon his photographic subject. On the other hand, the light-sensitive device D¹ cannot be constructed to quite as high a degree of accuracy as the light-sensitive device D, since, generally speaking, galvanometers with a moving permanent magnet and moving galvanometer coil are not as accurate as galvanometers in which one of these two elements is stationary. It has been found, however that both types of light-sensitive devices herein described can be constructed well within the limits of accuracy necessary for ordinary photographic use.

It is also possible to provide another modified form of light-sensitive device D² as shown in FIGS. 10–12, inclusive. This form of light-sensitive device D² is substantially similar in terms of components and function to the previously described light-sensitive device D, except that the components are arranged in "in-line" relationship, so to speak. The light-sensitive device D² comprises an outer shell or housing 200 which includes a semi-cylindrical top wall 201 provided with a viewing aperture or window opening 202 which is closed by an arcuate transparent window 203 adhesively or otherwise suitably secured in place. The housing 200 is also provided with a removable bottom wall 204 which is externally provided with a foot-plate 205 substantially similar to the previously described foot-plate 28. Rigidly mounted upon the interior face of the bottom wall 204 is a bracket 206 including vertical legs 207, 208, 209, and horizontal bights 210, 211, the latter being mounted directly upon the upper face of the bottom wall 204 by means of common fastening elements 212, 213, which serve to hold the foot-plate 205 in place. The bight 210 is spaced upwardly from and is parallel to the bottom wall 204 and supports an open-ended horizontal cylindrical frame-element 214 which is provided adjacent its opposite ends with horizontal arms 215, 216, carrying horizontally aligned jeweled bearings 217, 218, which, in turn, pivotally support a galvanometer coil 219. The galvanometer coil is substantially identical to the previously described galvanometer coil 56 and is provided with spiral-spring conductors 220, 221, and a needle arm 222, which is laterally bent to provide a horizontal indicator-needle 223 extending directly beneath the window 203 and above the arcuate upper surface of the frame-element 214. The spiral-spring conductors 220, 221, are respectively connected by means of conductors 224, 225, to a photocell 226 which is similar in all respects to the previously described photocells 37 and 130 and is suitably mounted in an opening 227 formed in the side wall 228 of the housing 200.

The legs 208, 209, of the frame 206 are provided with axially aligned jeweled bearings 229, 230, which are coaxial with the jeweled bearings 217, 218, and operatively support a follower magnet 231 which is provided with a needle arm 232 having a laterally bent indicator-needle 223 which extends into the space between the window 203 and the upper arcuate surface of the frame-element 214, so as to be capable of alignment with the indicator-needle 223, all as best seen in FIG. 11.

Similarly, the housing 200 is provided with a side wall 234 having an integrally formed tubular boss 235 for receiving the mounting-shank 236 of a rheostat 237 which is substantially similar in all respects to the previously described rheostat 39 and is connected by conductors 238, 238', in series with the galvanometer coil 219 and the photocell 226 in the same manner as previously described in conjunction with the photocell 37, the rheostat 39, and the galvanometer coil 56. The rheostat 237 is provided with a rotating shaft 239 which projects outwardly through the housing wall 234 and is externally provided with a manually operable knob or handle 240 having an index mark 241 for visual association with a scale 242 imprinted upon the external surface of the top wall 201 and calibrated to conform to ASA film-speed ratings.

Rotatably mounted in a rear wall 243 of the housing 200 is a shaft 244 externally provided with a manually operable knob or handle 245 and internally provided with a biasing magnet 246 substantially similar in construction and function to the previously described biasing magnet 65, and having a loading spring 247 which similarly holds the biasing magnet 246 in any position of adjustment to which it may be rotated by suitable manipulation of the knob 245.

The light-sensitive device $D^2$ may be set and will operate in precisely the same manner as the previously described light-sensitive device $D^1$ but may be considered, by some users, as being easier to read or observe, since the indicator-needles 223, 233, rotate around cylindrical arcs and are, therefore, always in straight-line or parallel relationship.

It is also possible to provide a further modified form of light-sensitive device $D^3$, as shown in FIGS. 13 to 18, inclusive. This light-sensitive device $D^3$ is substantially identical in all respects with the previously described light-sensitive device $D^2$ except that the biasing magnet 246, and the structure associated therewith, is eliminated. Instead, the light-sensitive device includes a housing 300 which has a somewhat elongated forward extension 301 provided with a transversely extending forward wall 302 having a window aperture 303 provided with a transparent window 304. Molded directly into the forward extension 301 and extending transversely thereacross in rearwardly spaced parallel relation to the window 304 is a cross-wall 305 which supports a photocell 306. Journaled at their ends in and extending horizontally across the housing-extension 301 are pairs of tangent rubber-sheathed rollers 307—308, 309—310, which are respectively located above and below the photocell 306 and at the upper and lower ends respectively of spaced parallel felt slides 311, 312. Similarly journaled at its opposite ends in and extending horizontally across the bottom of the housing-extension 301 in rearwardly spaced relation to the photocell 306 is a single rubber-sheathed idler roller 313. Likewise journaled at its opposite ends in and extending horizontally across the upper portion of the housing-extension 301 in upwardly spaced parallel relation to the roller 313 is a shaft 314 which supports sprockets 315, 316. Trained over the sprockets 315, 316, is an endless semi-transparent belt 317 which extends around the idler roller 313 and between the rollers 307—308, 309—310. The forward vertical run of the belt 317 passes directly in front of the photocell 306 and is slidably disposed along its opposite vertical margins in the felt slides 311, 312, which serves as light seals. The semi-transparent belt 317 is actually provided with a coating of graded light-density in the manner of an extinction-type potometer, so that as the belt 317 is shifted up or down in front of the photocell 306, more or less light impinging thereon will be cut out. By this means, the response of the photocell 306 can be modified to correspond to various different ASA film-speed ratings.

Figures 13, 14, 15, 16, 17, 18:
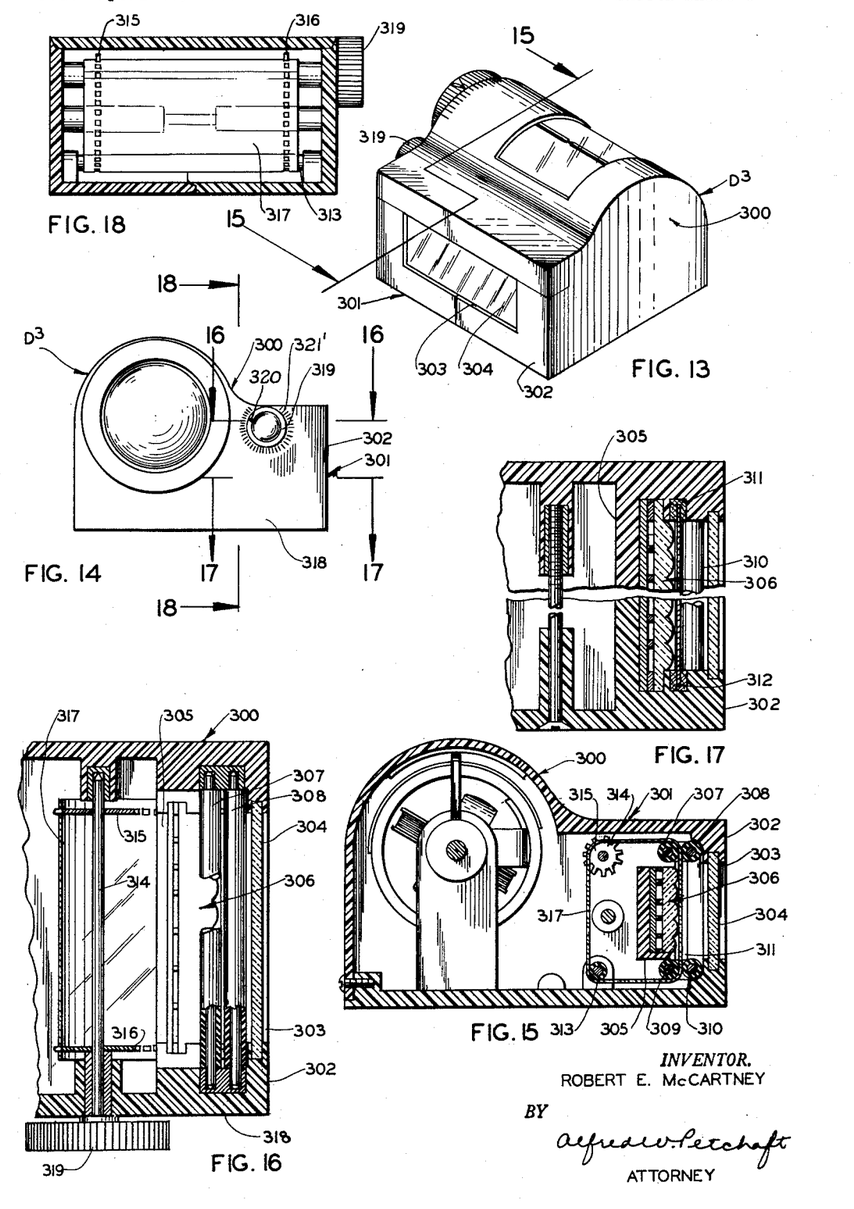
FIG. 13 is a perspective view of another modified form of light-sensitive device constructed in accordance with and embodying the present invention.
FIG. 14 is a side-elevational view of the modified form of light-sensitive device shown in FIG. 13.
FIG. 15 is a transverse sectional view taken along line 15—15 of FIG. 13.
FIGS. 16, 17, and 18, are fragmentary sectional views taken along lines 16—16, 17—17, and 18—18, respectively, of FIG. 14.

The shaft 314 projects, at one end, through a side wall 318 and is externally provided with a manually operable knob or handle 319 having an index mark 320 which is visually associated with a scale 321 imprinted on the external surface of the side wall 318. This scale 321 is, of course, suitably calibrated in terms of ASA film-speed ratings.

Except for the operation of the film-speed rating adjustment, the light-sensitive device $D^3$ functions and operates in substantially the same manner as the previously described light-sensitive device $D^2$.

Although, in all of the modifications above described, the rheostats 39, 237, and the belt 317 have been calibrated to correspond to film-speed ratings and the biasing magnets 65, 139, 246, have been calibrated to correspond to shutter-speeds, it should be understood that these respective elements can be calibrated for the opposite purposes. In other words, the rheostat 39 can be made and calibrated to correspond to shutter-speeds and the biasing magnet 65 can be made and calibrated to correspond to film-speed ratings.

It should be understood that changes and modifications in the form, construction, arrangement, and combination of the several parts of the means for coupling light meters to cameras, and in the steps of its production, may be made and substituted for those herein shown and described without departing from the nature and principle of my invention.

Having thus described my invention, what I claim and desire to secure by letters patent is:

1. A light sensitive accessory control device for cameras having an outer shell and aperture-setting means operatively associated with the camera, said aperture-setting means having a movable element located externally of said shell; said control device comprising a housing having means by which it may be externally mounted upon the shell, a permanent magnet having means by which it may be rigidly mounted on the aperture-setting means for movement therewith, galvanometer means operatively mounted in the housing, visible indicator means operatively associated with the galvanometer means, a photocell located for sensing light falling upon the subject toward which the camera is directed, means whereby said photocell is adapted to deliver to the galvanometer means an electrical current capable of deflecting the galvanometer means responsive to the intensity of said light, magnetic means operatively associated with said galvanometer means, and magnetically interlocked with the permanent magnet on the aperture-setting means so as to follow said permanent magnet as the aperture-setting means is moved from one setting to another, and means for correlating the movements of the magnetic means and galvanometer indicator means to indicate the appropriate aperture-setting to correspond with a selected shutter speed and the intensity of said light.

2. A light sensitive accessory control device for cameras having an outer shell and aperture-setting means operatively associated with the camera, said aperture-setting means having a movable element located externally of said shell; said control device comprising a housing having means by which it may be externally mounted upon the shell, a permanent magnet having means by which it may be rigidly mounted on the aperture-setting means for movement therewith, galvanometer means operatively mounted in the housing, visible indicator means operatively associated with the galvanometer means, a photocell located for sensing light falling upon the subject toward which the camera is directed, means whereby said photocell is adapted to deliver to the galvanometer means an electrical current capable of deflecting the galvanometer means in direct proportion to the intensity of said light, magnetic means operatively associated with said galvanometer means, and magnetically interlocked with the permanent magnet on the aperture-setting means so as to follow said permanent magnet as the aperture-setting means is moved from one setting to another, and means for correlating the movements of the magnetic means and galvanometer indicator means to indicate the appropriate aperture-setting to correspond with a selected shutter speed and the intensity of said light.

3. A light sensitive accessory control device for cameras having an outer shell and aperture-setting means operatively associated with the camera, said aperture-setting means having a movable element located externally of said shell, said control device comprising a housing having means by which it may be externally mounted upon the shell, a permanent magnet having means by which it may be rigidly mounted on the aperture-setting means for movement therewith, galvanometer means operatively mounted in the housing, visible indicator means operatively associated with the galvanometer means, a photocell located for sensing light falling upon the subject toward which the camera is directed, said photocell being adapted to deliver to the galvanometer means an electrical current capable of deflecting the galvanometer means responsive to the intensity of said light, magnetic means operatively associated with said galvanometer means, and magnetically interlocked with the permanent magnet on the aperture-setting means so as to follow said permanent magnet as the aperture-setting means is moved from one setting to another, means for correlating the movements of the magnetic means and galvanometer indicator means to indicate the appropriate aperture-setting to correspond with a selected shutter speed and the intensity of said light, and biasing means for modifying the position of said magnetic means to correspond with a selected film-speed rating.

4. A light sensitive accessory control device for cameras having an outer shell and aperture-setting means operatively associated with the camera, said aperture-setting means having a movable element located externally of said shell, said control device comprising a housing having means by which it may be externally mounted upon the shell, a permanent magnet having means by which it may be rigidly mounted on the aperture-setting means for movement therewith, galvanometer means operatively mounted in the housing, visible indicator means operatively associated with the galvanometer means, a photocell located for sensing light falling upon the subject toward which the camera is directed, said photocell being adapted to deliver to the galvanometer means an electrical current capable of deflecting the galvanometer means responsive to the intensity of said light, magnetic means operatively associated with said galvanometer means, and magnetically interlocked with the permanent magnet on the aperture-setting means so as to follow said permanent magnet as the aperture-setting means is moved from one setting to another, means for correlating the movements of the magnetic means and galvanometer indicator means to indicate the appropriate aperture-setting to correspond with a selected shutter speed and the intensity of said light, said correlating means including means associated with the galvanometer means for modifying the movement of said galvanometer indicator means to correspond with a selected shutter speed.

5. A light sensitive accessory control device for cameras having an outer shell and aperture-setting means operatively associated with the camera, said aperture-setting means having a movable element located externally of said shell; said control device comprising a housing having means by which it may be externally mounted upon the shell, a permanent magnet having means by which it may be rigidly mounted on the aperture-setting means for movement therewith, galvanometer means operatively mounted in the housing, visible indicator means operatively associated with the galvanometer means, a photocell located for sensing light falling upon the subject toward which the camera is directed, said photocell being adapted to deliver to the galvanometer means an electrical current capable of deflecting the galvanometer means responsive to the intensity of said light, magnetic means operatively associated with said galvanometer means, and magnetically interlocked with the permanent magnet on the aperture-setting means so as to follow said permanent magnet as the aperture-setting means is moved from one setting to another, means for correlating the movements of the magnetic means and galvanometer indicator means to indicate the appropriate aperture-setting to correspond with a selected shutter speed and the intensity of said light, and means associated with the galvanometer means for modifying the movement of said galvanometer indicator means to correspond with a selected film-speed rating.

6. For use with cameras having an outer shell and aperture-setting means including a movable element located externally of said shell; a light sensitive accessory control device comprising a housing having means by which it may be externally mounted upon the shell, said housing also having a viewing-aperture formed in one of its walls, a first permanent magnet having means by which it can be rigidly mounted on the aperture-setting means for movement therewith, a galvanometer mounted in the housing and having a movable indicator means mounted in position so as to be visible through said viewing-aperture, a photocell located for sensing light falling upon the subject toward which the camera is directed, said photocell being electrically connected to said galvanometer and being capable of deflecting said indicator means responsive to the intensity of said light, a second permanent magnet rotatably mounted in the housing and having indicia-means secured thereto for movement therewith, said indicia-means being mounted in juxtaposition to the indicator means so as to be visible through said viewing-aperture, said second permanent magnet being magnetically interlocked with the first permanent magnet so as to follow said first permanent magnet as the aperture-setting means is moved from one setting to another, and biasing means for modifying the position of said galvanometer indicator means to correspond with a selected film-speed rating.

7. For use with cameras having an outer shell and aperture-setting means including a movable element located externally of said shell; a light sensitive accessory control device comprising a housing having means by which it may be externally mounted upon the shell, a first magnet having means by which it may be rigidly mounted on the aperture-setting means for movement therewith, a galvanometer coil rotatably mounted in said housing, a second magnet fixedly mounted within the housing in proximity to said galvanometer coil for causing said galvanometer coil to deflect when it is energized, visible indicator means operatively associated with the galvanometer coil, a photocell located for sensing light falling upon the subject toward which the camera is directed, said photocell being electrically connected to said galvanometer coil for energizing said galvanometer coil responsive to the intensity of light, a third magnet mounted within said housing for operative movement therein, visible indicia-means operatively connected to and movable with said third magnet, said indicia-means being located in juxtaposition to the indicator means so that the relative positions thereof may be visually compared, means for biasing said third magnet to a predetermined position, representing a preselected constant, said third magnet being magnetically interlocked with the first magnet mounted on said aperture-setting means so as to follow said first magnet as the aperture-setting means is moved from one setting to another whereby the indicia-means can be brought into coincidence with the indicator means and thus indicate the appropriate position of the aperture-setting means to correspond with the intensity of light sensed by the photocell.

8. For use with cameras having an outer shell and aperture-setting means including a movable element located externally of said shell; a light sensitive accessory control device comprising a housing having means by which it may be externally mounted upon the shell, a first magnet having means by which it may be rigidly mounted on the aperture-setting means for movement therewith, a galvanometer coil rotatably mounted in said housing, a second magnet fixedly mounted within the housing in proximity to said galvanometer coil for causing said galvanometer coil to deflect, visible indicator means operatively associated with the galvanometer coil, a photocell located for sensing light falling upon the subject toward which the camera is directed, said photocell being electrically connected to said galvanometer coil for energizing said galvanometer coil responsive to the intensity of light, a third magnet mounted within said housing for operative movement therein, visible indicia-means operatively connected to and movable with said third magnet, said indicia-means being located in juxtaposition to the indicator so that the relative positions thereof may be visually compared, means for biasing said third magnet to correspond to a selected shutter speed on said camera, said third magnet being magnetically interlocked with the first magnet mounted on said aperture-setting means so as to follow said first magnet as the aperture-setting means is moved from one setting to another, whereby the indicia-means can be brought into coincidence with the indicator means and thus indicate the appropriate position of the aperture-setting means to correspond with the intensity of light sensed by the photocell.

9. For use with cameras having an outer shell and aperture-setting means including a movable element located externally of said shell; a light sensitive accessory control device comprising a housing having means by which it may be externally mounted upon the shell, a first magnet having means by which it may be rigidly mounted on the aperture-setting means for movement therewith, a galvanometer coil rotatably mounted in said housing, a second magnet fixedly mounted within the housing in proximity to said galvanometer coil to cause said galvanometer coil to deflect when it is energized, visible indicator means operatively associated with the galvanometer coil, a photocell located for sensing light falling upon the subject toward which the camera is directed, said photocell being electrically connected to said galvanometer coil for energizing said galvanometer coil responsive to the intensity of light, a third magnet mounted within said housing for operative movement therein, visible indicia-means operatively connected to and movable with said third magnet, said indicia-means being located in juxtaposition to the indicator means so that the relative positions thereof may be visually compared, a fourth magnet magnetically interlocked with said third magnet for biasing said third magnet to correspond to a selected shutter speed on said camera, said third magnet being magnetically interlocked with the first magnet mounted on said aperture-setting means so as to follow said first magnet as the aperture-setting means is moved from one setting to another, whereby the indicia-means can be brought into coincidence with the indicator means and thus indicate the appropriate position of the aperture-setting means to correspond with the intensity of light sensed by the photocell.

10. For use with cameras having an outer shell and aperture-setting means including a movable element located externally of said shell; a light sensitive accessory control device comprising a housing having means by which it may be externally mounted upon the shell, a first magnet having means by which it may be rigidly mounted on the aperture-setting means for movement therewith, a galvanometer coil rotatably mounted in said housing, a second magnet fixedly mounted within the housing in proximity to said galvanometer coil to cause said galvanometer coil to deflect when it is energized, means for adjusting said galvanometer coil and said second magnet to a predetermined position representing a preselected constant, visible indicator means operatively associated with the galvanometer coil, a photocell located for sensing light falling upon the subject toward which the camera is directed, said photocell being electrically connected to said galvanometer coil for energizing said galvanometer coil responsive to the intensity of light, a third magnet mounted within said housing for operative movement therein, visible indicia-means operatively connected to and movable with said third magnet, said indicia-means being located in juxtaposition to the indicator means so that the relative positions thereof may be visually compared, means for biasing said third magnet to correspond to a selected shutter speed on said camera, said third magnet being magnetically interlocked with the first magnet mounted on said aperture-setting means so as to follow said first magnet as the aperture-setting means is moved from one setting to another, whereby the indicia-means can be brought into coincidence with the indicator means and thus indicate the appropriate position of the aperture-setting means to correspond with the intensity of light sensed by the photocell.

11. For use with a camera having an outer shell and aperture-setting means including a movable element located externally of said shell; a light sensitive accessory control device comprising a housing having means by which it may be externally mounted upon the shell, a first permanent magnet having means by which it may be rigidly mounted on the aperture-setting means for movement therewith, a galvanometer coil rotatably mounted in said housing, a second permanent magnet fixedly mounted within the housing in proximity to said galvanometer coil to cause said galvanometer coil to deflect when it is energized, a rheostat operatively connected to said galvanometer coil for adjusting film speed, visible indicator means operatively associated with the galvanometer coil, a photocell located for sensing light falling upon the subject toward which the camera is directed, said photocell being electrically connected to said galvanometer coil for energizing said galvanometer coil responsive to the intensity of light, a third permanent magnet mounted within said housing for operative movement therein, visible indicia-means operatively connected to and movable with said third magnet, said indicia-means being located in juxtaposition to the indicator means so that the relative positions thereof may be visually compared, a fourth permanent magnet magnetically interlocked with said third permanent magnet for biasing said third permanent magnet to correspond to a selected shutter speed on said camera, said third permanent magnet being magnetically interlocked with said first permanent magnet mounted on said aperture-setting means so as to follow said first permanent magnet as the aperture-setting means is moved from one setting to another, whereby the indicia-means can be brought into coincidence with the indicator means and thus indicate the appropriate position of the aperture-setting means to correspond with the intensity of light sensed by the photocell.

12. For use with cameras having a shell and aperture-setting means operatively associated with the shell, said aperture-setting means having a movable element located externally of said shell; an accessory light meter comprising a housing having means by which it may be externally mounted upon the shell, a first magnet mounted within said housing, a galvanometer coil rotatably mounted on said magnet, a visible indicator associated with said galvanometer coil, a photocell located for sensing light falling upon the subject toward which the camera is directed, said photocell being electrically connected to said galvanometer coil for causing said galvanometer coil to deflect when it is energized, a rheostat operatively connected to said galvanometer coil for setting a preselected film speed, a second magnet rotatably mounted in said housing for operative movement therein, visible indicia-means operatively connected to and movable with said second magnet, said indicia-means being located in juxtaposition to said indicator means so that the relative positions thereof may be visually compared, a third magnet magnetically interlocked with said second magnet for adjusting said second magnet to a preselected shutter speed also set on said camera aperture-setting means, a fourth magnet mounted on said aperture-setting means for movement therewith and magnetically interlocked with said second magnet so that said second magnet will be moved as said fourth magnet is rotated with the aperture-setting means, whereby the indicia-means can be brought into coincidence with the indicator means and thus indicate the appropriate position of the aperture-setting means to correspond with the intensity of light sensed by said photocell.

13. For use with cameras having an outer shell and aperture-setting means including a movable element located externally of said shell; a light sensitive accessory control device comprising a housing having means by which it may be externally mounted upon the shell, a first permanent magnet having means by which it may be rigidly mounted on the aperture-setting means for movement therewith, a second permanent magnet mounted within said housing, a galvanometer operatively mounted in the housing in proximity to and having a rotatable coil located on said second permanent magnet, whereby to cause said galvanometer to deflect when it is energized, visible indicator means operatively associated with the galvanometer, a photocell located for sensing light falling upon the subject toward which the camera is directed, said photocell being electrically connected to said galvanometer for energizing said galvanometer responsive to the intensity of light, magnetic indicia-means operatively mounted in the housing and being also located in proximity to said galvanometer for permitting comparison of the relative positions of said indicator means and said indicia-means, said magnetic means being magnetically interlocked with the first permanent magnet on the aperture-setting means so as to follow said first permanent magnet as the aperture-setting means is moved from one setting to another.

14. For use with cameras having an outer shell and aperture-setting means including a movable element located externally of said shell; a light sensitive accessory control device comprising a housing having means by which it may be externally mounted upon the shell, a first permanent magnet having means by which it may be rigidly mounted on the aperture-setting means for movement therewith, a second permanent magnet mounted within said housing, a galvanometer operatively mounted in the housing and having a rotatable coil located in proximity to said second permanent magnet whereby said galvanometer will deflect when it is energized, visible indicator means operatively associated with the galvanometer, a photocell located for sensing light falling upon the subject toward which the camera is directed, said photocell being electrically connected to said galvanometer for energizing said galvanometer responsive to the intensity of light, adjustable means associated with said galvanometer for modifying the movement of said galvanometer, and a third permanent magnet operatively mounted in the housing and connected to indicia-means and being also located in proximity to said galvanometer for permitting comparison of the relative positions of said indicator means and said indicia-means, said third permanent magnet being magnetically interlocked with the first permanent magnet on the aperture-setting means so as to follow said first permanent magnet as the aperture-setting means is moved from one setting to another.

References Cited in the file of this patent

UNITED STATES PATENTS

| | | |
|---|---|---|
| 2,194,152 | Riszdorfer | Mar. 19, 1940 |
| 2,242,043 | Sanger | May 13, 1941 |
| 2,250,898 | Tonnies | July 29, 1941 |
| 2,278,338 | Tonnies | Mar. 31, 1942 |
| 2,354,544 | Rath | July 25, 1944 |
| 2,477,235 | Broido | July 26, 1949 |
| 2,596,328 | Dorsey | May 13, 1952 |
| 2,630,049 | Stein | Mar. 3, 1953 |
| 2,874,622 | Gebele | Feb. 24, 1959 |